US010632439B2

(12) United States Patent
Pretz et al.

(10) Patent No.: US 10,632,439 B2
(45) Date of Patent: Apr. 28, 2020

(54) SYSTEM COMPONENTS OF FLUID CATALYTIC REACTOR SYSTEMS

(71) Applicant: Dow Global Technologies LLC, Midland, MI (US)

(72) Inventors: Matthew T. Pretz, Freeport, TX (US); Donald F. Shaw, Denville, NJ (US); Fermin Alejandro Sandoval, Houston, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/309,548

(22) PCT Filed: May 31, 2017

(86) PCT No.: PCT/US2017/035204
§ 371 (c)(1),
(2) Date: Dec. 13, 2018

(87) PCT Pub. No.: WO2017/218187
PCT Pub. Date: Dec. 21, 2017

(65) Prior Publication Data
US 2019/0314782 A1 Oct. 17, 2019

Related U.S. Application Data

(60) Provisional application No. 62/351,591, filed on Jun. 17, 2016.

(51) Int. Cl.
*B01J 8/26* (2006.01)
*B01J 8/18* (2006.01)
(Continued)

(52) U.S. Cl.
CPC ............. *B01J 8/26* (2013.01); *B01J 8/005* (2013.01); *B01J 8/1863* (2013.01); *C10G 11/18* (2013.01);
(Continued)

(58) Field of Classification Search
CPC . B01J 8/26; B01J 8/1863; B01J 8/1872; B01J 8/388; B01J 2208/00761; B01J 2208/00991; C10G 11/18; C10G 11/182
See application file for complete search history.

(56) References Cited

U.S. PATENT DOCUMENTS 3,926,778 A 12/1975 Hartley et al.
3,948,757 A 4/1976 Strother
(Continued)

FOREIGN PATENT DOCUMENTS

EP 206399 A2 12/1986
EP 2719451 A1 4/2014

OTHER PUBLICATIONS

International Search Report and Written Opinion pertaining to PCT/US2017/035204 dated Jul. 21, 2017.
(Continued)

*Primary Examiner* — Lessanework Seifu
(74) *Attorney, Agent, or Firm* — Dinsmore & Shohl LLP

(57) ABSTRACT

According to one or more embodiments disclosed herein, a system component of a fluid catalytic reactor system may include a catalyst separation section, a riser, and a reactor vessel. The catalyst separation section may include separation section walls defining an interior region of the catalyst separation section, a gas outlet port, a riser port, a separation device, and a catalyst outlet port. The riser may extend through the riser port of the catalyst separation section and include an external riser section and an internal riser section. The reactor vessel may include a reactor vessel inlet port,
(Continued)

and a reactor vessel outlet port in fluid communication with the external riser section of the riser.

15 Claims, 5 Drawing Sheets

(51) Int. Cl.
  *B01J 8/00* (2006.01)
  *C10G 11/18* (2006.01)
(52) U.S. Cl.
  CPC .............. *B01J 2208/00761* (2013.01); *B01J 2208/00991* (2013.01)

(56) References Cited

U.S. PATENT DOCUMENTS

| | | | |
|---|---|---|---|
| 4,197,189 A * | 4/1980 | Thompson | B01J 8/1818 208/164 |
| 4,283,273 A | 8/1981 | Owen | |
| 5,328,667 A | 7/1994 | Johnson | |
| 5,958,222 A | 9/1999 | Radcliffe et al. | |
| 6,872,867 B1 | 3/2005 | Senetar | |
| 7,122,160 B2 * | 10/2006 | Brookhart | B01J 8/0055 422/145 |
| 8,669,406 B2 | 3/2014 | Pretz et al. | |
| 9,233,354 B1 | 1/2016 | Sandacz et al. | |
| 9,358,516 B2 | 6/2016 | Tammera et al. | |
| 9,375,695 B2 * | 6/2016 | Johnson | C10G 11/182 |
| 2004/0104148 A1 | 6/2004 | Lomas et al. | |
| 2007/0227356 A1 | 10/2007 | Beech | |
| 2013/0248420 A1 | 9/2013 | Palmas | |
| 2014/0200385 A1 | 7/2014 | Pretz et al. | |
| 2015/0298037 A1 | 10/2015 | Pretz et al. | |
| 2016/0030906 A1 | 2/2016 | Crnkovic et al. | |

OTHER PUBLICATIONS

Office Action pertaining to corresponding Russian Patent Application No. 2018145484, dated Feb. 13, 2019.

\* cited by examiner

SYSTEM COMPONENTS OF FLUID CATALYTIC REACTOR SYSTEMS

CROSS REFERENCE TO RELATED APPLICATIONS

This application claims priority to U.S. Provisional Application 62/351,591, filed Jun. 17, 2016, which is incorporated herein by reference in its entirety.

BACKGROUND

Field

The present disclosure generally relates to reactor units for chemical processing, and more specifically, to fluid catalytic reactor units.

Technical Background

Generally, a fluid catalytic reactor system may include a reactor unit and a regeneration unit. The reactor unit converts the feedstock chemical into the product chemical by contact with the catalyst. During the reaction, the catalyst may become "spent," and have reduced activity in reactions thereafter. Therefore, the spent catalyst may be transferred to the regeneration unit to be regenerated, thus increasing its activity from its spent state and making it available for further catalytic processes. Following regeneration in the regeneration unit, the regenerated catalyst is transferred back into the reactor unit for continued reactions with feedstock chemicals.

However, mechanical problems in fluid catalytic reactor systems may be present due to the large loads of catalyst placed in the system and the relatively high temperatures at which the reactions take place. For example, conventional fluid catalytic reactor systems may utilize a design where the reactor and separator of the main reactor section and regeneration section, respectively, are in direct contact with one another, and the reactor and separator may be contained in a unitary structure. For example, in conventional examples, the top walls of the reactor may be the bottom walls of the separator. However, intense thermal conditions in the reactor may demand complex designs at the intersection of the reactor and separator. Accordingly, improved system components for fluid catalytic cracking units may be beneficial.

BRIEF SUMMARY

The present disclosure relates to designs for system components of catalytic reactor systems, such as reactor sections or regeneration sections of fluid catalytic reactor systems. According to one embodiment, each of the presently disclosed components of the fluid catalytic reactor systems (such as a reactor section or a regeneration section) may comprise a separate reactor vessel and catalyst separation section. For example, the reactor vessel and catalyst separation section may be spaced apart from one another and connected with a riser. In such a design, thermal transport in the system may be better controlled, especially at sensitive portions of the system such as at the catalyst outlet ports of the reactor section and/or the regeneration section, which may be prone to mechanical failure of the vessel or refractory portions of the system when subjected to heat from the reactor section.

Generally, a catalytic reactor system may include a main reactor section utilized for converting the chemical feedstock, sometimes referred to herein as the "reactor section," and a regeneration section for regenerating the catalyst. Each of the main reactor section and the regeneration section include a reactor vessel and a separation device located in a catalyst separation section, which is utilized to separate the catalyst from other materials present in the system. For example, a main reactor section generally includes a reactor vessel, where a reaction such as catalytic cracking or dehydrogenation may take place, and a catalyst separation section utilized to separate the spent catalyst utilized in the cracking reaction. Similarly, the regeneration section includes a reactor vessel (such as a combustion vessel), where spent catalyst may be, for example, de-coked and/or supplemental fuel may be combusted, and a catalyst separator utilized to separate the regenerated catalyst from the process gases of the combustion reaction. Generally, the respective reactors (e.g., the main process reactor and the combustor) may be positioned below the separators, and a riser may be utilized to move the catalyst upward from each the reactor to each catalyst separator. As the basic scheme of movement and reaction may be similar in the reactor section and the regenerator section, their designs may be similar, or at least incorporate similar design principles, as will be disclosed herein.

According to one embodiment of the present disclosure, a system component of a fluid catalytic reactor system, such as a reactor section or a regeneration section of a fluid catalytic reactor system, may comprise a catalyst separation section, a riser, and a reactor vessel. The catalyst separation section may comprise separation section walls defining an interior region of the catalyst separation section, a gas outlet port, a riser port, a separation device, and a catalyst outlet port. The riser may extend through the riser port of the catalyst separation section. The riser may comprise a main interior riser wall segment, a main exterior riser wall segment, and a riser transition wall segment. The main interior riser wall segment may be positioned at least partially in the interior region of the catalyst separation section and connected with at least the main interior riser wall segment. The exterior riser wall segment may be positioned at least partially outside of the catalyst separation section. The reactor vessel may comprise a reactor vessel inlet port, and a reactor vessel outlet port in fluid communication with the main exterior riser wall segment of the riser.

In accordance with another embodiment of the present disclosure, a fluid catalytic reactor system may comprise a reactor section and a regeneration section. The reactor section may comprise a catalyst separation section, a riser, and a reactor vessel. The catalyst separation section may comprise separation section walls defining an interior region of the catalyst separation section, a gas outlet port, a riser port, a separation device, and a catalyst outlet port. The riser may extend through the riser port of the catalyst separation section. The riser may comprise a main interior riser wall segment, a main exterior riser wall segment, and a riser transition wall segment. The main interior riser wall segment may be positioned at least partially in the interior region of the catalyst separation section and connected with at least the main interior riser wall segment. The exterior riser wall segment may be positioned at least partially outside of the catalyst separation section. The reactor vessel may comprise a reactor vessel inlet port, and a reactor vessel outlet port in fluid communication with the main exterior riser wall segment of the riser.

In accordance with another embodiment of the present disclosure, a fluid catalytic reactor system may comprise a reactor section and a regeneration section. The regeneration section may comprise a catalyst separation section, a riser, and a reactor vessel. The catalyst separation section may comprise separation section walls defining an interior region of the catalyst separation section, a gas outlet port, a riser port, a separation device, and a catalyst outlet port. The riser may extend through the riser port of the catalyst separation section. The riser may comprise a main interior riser wall segment, a main exterior riser wall segment, and a riser transition wall segment. The main interior riser wall segment may be positioned at least partially in the interior region of the catalyst separation section and connected with at least the main interior riser wall segment. The exterior riser wall segment may be positioned at least partially outside of the catalyst separation section. The reactor vessel may comprise a reactor vessel inlet port, and a reactor vessel outlet port in fluid communication with the main exterior riser wall segment of the riser.

It is to be understood that both the foregoing brief summary and the following detailed description present embodiments of the technology, and are intended to provide an overview or framework for understanding the nature and character of the technology as it is claimed. The accompanying drawings are included to provide a further understanding of the technology, and are incorporated into and constitute a part of this specification. The drawings illustrate various embodiments and, together with the description, serve to explain the principles and operations of the technology. Additionally, the drawings and descriptions are meant to be merely illustrative, and are not intended to limit the scope of the claims in any manner.

Additional features and advantages of the technology disclosed herein will be set forth in the detailed description which follows, and in part will be readily apparent to those skilled in the art from that description or recognized by practicing the technology as described herein, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Figure 1:
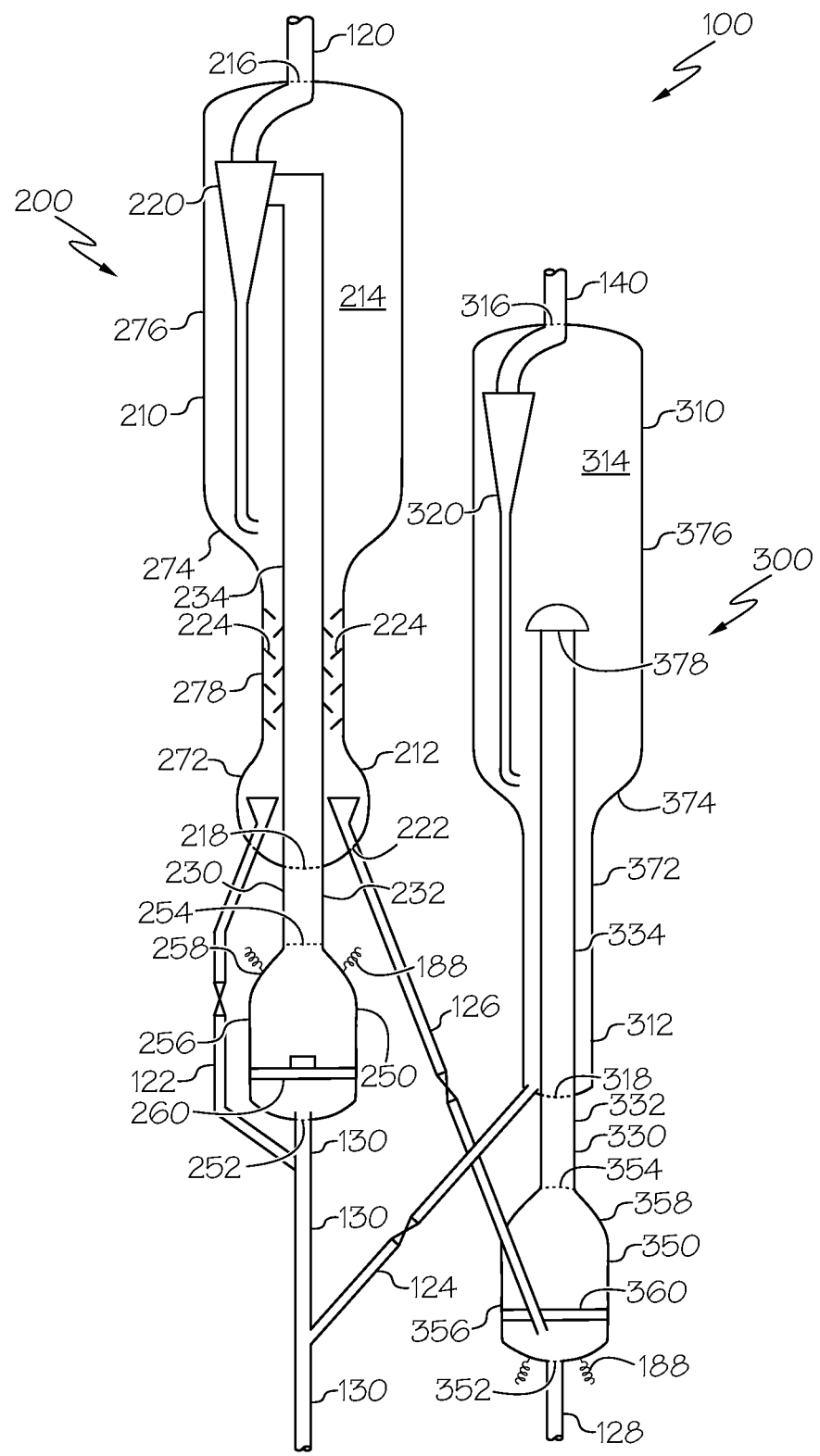
FIG. 1 schematically depicts a fluid catalytic reactor system, according to one or more embodiments disclosed herein.

It should be understood that the drawings are schematic in nature, and do not include some components of a fluid catalytic reactor system commonly employed in the art, such as, without limitation, temperature transmitters, pressure transmitters, flow meters, pumps, valves, and the like. It would be known that these components are within the spirit and scope of the present embodiments disclosed. However, operational components, such as those described in the present disclosure, may be added to the embodiments described in this disclosure.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Reference will now be made in greater detail to various embodiments of system components of fluid catalytic reactor systems, some embodiments of which are illustrated in the accompanying drawings. Referring now to FIG. 1, a fluid catalytic reactor system 100 is schematically depicted. The fluid catalytic reactor system 100 generally comprises multiple system components, such as a reactor section 200 and/or a regeneration section 300. As used herein, a "reactor section" generally refers to the portion of a fluid catalytic reactor system in which the major process reaction takes place, and catalyst (sometimes spent, meaning it is at least partially deactivated) is separated from the product stream of the reaction. Also, as used herein, a "regeneration section" generally refers to the portion of a fluid catalytic reactor system where the catalyst is regenerated, such as through combustion, and the regenerated catalyst is separated from the other process materials, such as evolved gases from the combusted material previously on the de-activated catalyst or from supplemental fuel. The reactor section 200 generally includes a reactor vessel 250, a riser 230 including an external riser section 232 and an internal riser section 234, and a catalyst separation section 210. The regeneration section 300 generally includes a reactor vessel 350, a riser 330 including an external riser section 332 and an internal riser section 334, and a catalyst separation section 310. Generally, the catalyst separation section 210 may be in fluid communication with the reactor vessel 350 (e.g., via standpipe 126) and the catalyst separation section 310 may be in fluid communication with the reactor vessel 250 (e.g., via standpipe 124 and transport riser 130).

As used herein, an "external riser section" refers to the portion of the riser that is outside of the catalyst separation section, and an "internal riser section" refers to the portion of the riser that is within the catalyst separation section.

For example, the internal riser section 234 of the reactor section 200 may be positioned within the catalyst separation section 210, while the external riser section 232 is positioned outside of the catalyst separation section 210. Similarly, the internal riser section 334 of the regeneration section 300 may be positioned within the catalyst separation section 310, while the external riser section 332 is positioned outside of the catalyst separation section 310.

According to one or more embodiments described herein, the external riser section 232 of the riser 230 of the reactor section 200 and/or the external riser section 332 of the riser 330 of the regeneration section 300 may have a length which is greater than its maximum diameter. That is, for the external riser section 232 of the riser 230 of the reactor section 200, the distance between the riser port 218 and the reactor vessel outlet port 254 (i.e., measured in FIG. 1 in the vertical direction) may be greater than the maximum diameter of the external riser section 232, where the "maximum diameter" refers to the greatest diameter in any portion of the external riser section 232 (i.e., measured in FIG. 1 in the horizontal direction). Similarly, for the external riser section 332 of the riser 330 of the regeneration section 300, the distance between the riser port 318 and the reactor vessel outlet port 354 (i.e., measured in FIG. 1 in the vertical direction) may be greater than the maximum diameter of the external riser section 332, where the "maximum diameter" refers to the greatest diameter in any portion of the external riser section 332 (i.e., measured in FIG. 1 in the horizontal direction). The diameter of the external riser section 232 and/or external riser section 332 may be substantially constant (i.e., not vary by more than about 10%), and may be tubular in shape.

Generally, the fluid catalytic reactor system 100 may be operated by feeding a chemical feed and a fluidized catalyst into the reactor vessel 250, and reacting the chemical feed by contact with a fluidized catalyst to produce a chemical product in the reactor vessel 250 of the reactor section 200. The chemical product and the catalyst may be passed out of the reactor vessel 250 and through the riser 230 to a separation device 220 in the catalyst separation section 210, where the catalyst is separated from the chemical product, which is transported out of the catalyst separation section 210. The separated catalyst is passed from the catalyst separation section 210 to the reactor vessel 350. In the reactor vessel 350, the catalyst may be regenerated by a chemical process such as combustion. For example, without limitation, the spent catalyst may be de-coked and/or supplemental fuel may be catalytically combusted. The catalyst is then passed out of the reactor vessel 350 and through the riser 330 to a riser termination separator 378, where the gas and solid components from the riser 330 are partially separated. The vapor and remaining solids are transported to a secondary separation device 320 in the catalyst separation section 310 where the remaining catalyst is separated from the gases from the regeneration reaction (e.g., gases emitted by combustion of spent catalyst). The separated catalyst is then passed from the catalyst separation section 310 to the reactor vessel 250, where it is further utilized in a catalytic reaction. Thus, the catalyst, in operation, may cycle between the reactor section 200 and the regeneration section 300. In general, the processed chemical streams, including the feed streams and product streams may be gaseous, and the catalyst may be fluidized particulate solid.

It should be understood that as used herein, a "system component" may refer to either of a reactor section 200 or a regeneration section 300 in a fluid catalytic reactor system 100, and that, in some embodiments, the fluid catalytic reactor system 100 may include either a reactor section 200 or a regeneration section 300, and not both. In other embodiments, the fluid catalytic reactor system 100 may include a single regeneration section 300 and multiple reactor sections 200 in fluid communication with the regeneration section 300. Additionally, as described herein, the structural features of the reactor section 200 and regeneration section 300 may be similar or identical in some respects. For example, each of the reactor section 200 and regeneration section 300 include a reactor vessel (i.e., reactor vessel 250 of the reactor section 200 and reactor vessel 350 of the regeneration section 300), a riser (i.e., riser 230 of the reactor section 200 and riser 330 of the regeneration section 300), and a catalyst separation section (i.e., catalyst separation section 210 of the reactor section 200 and catalyst separation section 310 of the regeneration section 300). It should be appreciated that since many of the structural features of the reactor section 200 and the regeneration section 300 may be similar or identical in some respects, similar or identical portions of the reactor section 200 and the regeneration section 300 have been provided reference numbers throughout this disclosure with the same final two digits, and disclosures related to one portion of the reactor section 200 may be applicable to the similar or identical portion of the regeneration section 300, and vice versa.

As depicted in FIG. 1, the reactor vessel 250 may include a reactor vessel catalyst inlet port 252 defining the connection of transport riser 130 to the reactor vessel 250, and may additionally include a reactor vessel outlet port 254 in fluid communication with (such as directly connected to) the external riser section 232 of the riser 230. As used herein, a "reactor vessel" refers to a drum, barrel, vat, or other container suitable for a given chemical reaction. A reactor vessel may be generally cylindrical in shaped (i.e., having a substantially circular diameter), or may alternately be non-cylindrically shaped, such as prism shaped with cross-sectional shaped of triangles, rectangles, pentagons, hexagons, octagons, ovals, or other polygons or curved closed shapes, or combinations thereof. Reactor vessels, as used throughout this disclosure, may generally include a metallic frame, and may additionally include refractory linings or other materials utilized to protect the metallic frame and/or control process conditions.

As described, the reactor vessel 250 may include a reactor vessel catalyst inlet port 252 and a reactor vessel outlet port 254. Generally, "inlet ports" and "outlet ports" of any system unit of the fluid catalytic reactor system 100 described herein refer to openings, holes, channels, apertures, gaps, or other like mechanical features in the system unit. For example, inlet ports allow for the entrance of materials to the particular system unit and outlet ports allow for the exit of materials from the particular system unit. Generally, an outlet port or inlet port will define the area of a system unit of the fluid catalytic reactor system 100 to which a pipe, conduit, tube, hose, transport line, or like mechanical feature is attached, or to a portion of the system unit to which another system unit is directly attached. While inlet ports and outlet ports may sometimes be described herein functionally in operation, they may have similar or identical physical characteristics, and their respective functions in an operational system should not be construed as limiting on their physical structures. Other ports, such as the riser port 218, may comprise an opening in the given system unit where other system units are directly attached, such as where the riser 230 extends into the catalyst separation section 210 at the riser port 218.

The reactor vessel 250 may be connected to a transport riser 130, which, in operation, may provide regenerated catalyst and/or reactant chemicals to the reactor section 200. The regenerated catalyst and/or reactant chemicals may be mixed with a distributor 260 housed in the reactor vessel 250. The catalyst entering the reactor vessel 250 via transport riser 130 may be passed through standpipe 124 to a transport riser 130, thus arriving from the regeneration section 300. In some embodiments, catalyst may come directly from the catalyst separation section 210 via standpipe 122 and into a transport riser 130, where it enters the reactor vessel 250. This catalyst may be slightly deactivated, but may still, in some embodiments, be suitable for reaction in the reactor vessel 250.

As depicted in FIG. 1, the reactor vessel 250 may be directly connected to the external riser section 232 of the riser 230. In one embodiment, the reactor vessel 250 may include a reactor vessel body section 256 and a reactor vessel transition section 258. The reactor vessel body section 256 may generally comprise a greater diameter than the reactor vessel transition section 258, and the reactor vessel transition section 258 may be tapered from the size of the diameter of the reactor vessel body section 256 to the size of the diameter of the external riser section 232 such that the reactor vessel transition section 258 projects inwardly from the reactor vessel body section 256 to the external riser section 232. It should be understood that, as used herein, the diameter of a portion of a system unit refers to its general width, as shown in the horizontal direction in FIG. 1.

As described herein, the riser 230 includes an external riser section 232 and an internal riser section 234 contained within the catalyst separation section 210. Still referring to FIG. 1, the catalyst separation section 210 includes separation section walls 212 defining an interior region 214 of the catalyst separation section 210. The riser 230 extends into the interior region 214 of the catalyst separation section 210 through the riser port 218. The riser port 218 may be any opening in the catalyst separation section 210 through which at least the internal riser section 234 of the riser 230 protrudes into the interior region 214 of the catalyst separation section 210.

In embodiments described herein, the reactor vessel transition section 258 may be outside of the catalyst separation section. In some conventional reactor and regeneration units, the portion of the reactor analogous to the reactor vessel transition section 258 may also be the bottom portion of the separation section. Thus, in conventional setups, the heat from the reactor may be conducted through the transition section and directly into the separation section. Instability in the materials of the reactor and/or separator may result from these high thermal loads, particularly at or near attachment points of standpipes.

In one or more embodiments, the catalyst separation section 210 may include several segments. For example, as depicted in FIG. 1, the catalyst separation section 210 may include an upper segment 276, a middle segment 278, and a lower segment 272. The internal riser section 234 of the riser 324 may extend through the riser port 218 of the catalyst separation section 210 and through the lower segment 272, the middle segment 278, and into the upper segment 276. Generally, at least the majority of the internal riser section 234 may have a substantially constant diameter, and may be similar in diameter to the external riser section 232 (relative to the other units in the system, such as within 10% of one another), but slightly smaller in diameter than the majority of the external riser section. At the upper segment 276 of the catalyst separation section 210, the internal riser section 234 may be in fluid communication with the separation device 220. The separation device 220 may be any mechanical or chemical separation devices which may be operable to separate solid particles from gas or liquid phases, such as a cyclone or plurality of cyclones.

According to one or more embodiments, the separation device 220 may be a cyclonic separation system, which may include two or more stages of cyclonic separation. In embodiments where the separation device 220 comprises more than one cyclonic separation stages, the first separation device into which the fluidized stream enters is referred to a primary cyclonic separation device. The fluidized effluent from the primary cyclonic separation device may enter into a secondary cyclonic separation device for further separation. Primary cyclonic separation devices may include, for example, primary cyclones, and systems commercially available under the names VSS (commercially available from UOP), $LD_2$ (commercially available from Stone and Webster), and $RS_2$ (commercially available from Stone and Webster). Primary cyclones are described, for example, in U.S. Pat. Nos. 4,579,716; 5,190,650; and 5,275,641, which are each incorporated by reference in their entirety herein. In some separation systems utilizing primary cyclones as the primary cyclonic separation device, one or more set of additional cyclones, e.g. secondary cyclones and tertiary cyclones, are employed for further separation of the catalyst from the product gas. It should be understood that any primary cyclonic separation device may be used in embodiments of the invention.

The catalyst may move upward through the riser 230 (from the reactor vessel 250), and into the separation device 220. The separation device 220 may be operable to deposit separated catalyst into the bottom of the upper segment 276 or into the middle segment 278 or lower segment 272. The separated vapors may be removed from the fluid catalytic reactor system 100 via a pipe 120 at a gas outlet port 216 of the catalyst separation section 210.

As depicted in FIG. 1, in one or more embodiments, the upper segment 276 of the catalyst separation section 210 may have a greater diameter than the middle segment 278, and the lower segment 272 may have a greater maximum diameter than the middle segment 278. The upper segment 276 of the catalyst separation section 210 may be connected to the middle segment 278 via a transition segment 274 which projects inwardly from the upper segment 276 to the middle segment 278. The upper segment 276 and/or the middle segment 278 may, respectively, have a relatively constant diameter (i.e., the diameter does not vary by more than about 20% in a particular section). The separation section walls 212 at the middle segment 278 and the internal riser section 234 may define a coaxial channel that houses a stripper 224. The stripper 224 may be utilized to remove product vapors from the catalyst prior to sending it regeneration section 300 for regeneration. As product vapors transported to the regeneration section 300 will be combusted, it is desirable to remove those product vapors with the stripper 224 and which utilizes less expensive gases for combustion than product gases.

Following separation from vapors in the separation device 220, the catalyst may generally move through the stripper 224 in the middle segment 278 and into the lower segment 272. The lower segment 272 may include the catalyst outlet port 222 where the catalyst is transferred out of the reactor section 200 via standpipe 126 and into the regeneration section 300. Optionally, the catalyst may also be transferred directly back into the reactor vessel 250 via standpipe 122. Alternatively, the catalyst may be premixed with regenerated catalyst in the transport riser 130.

Figure 2:
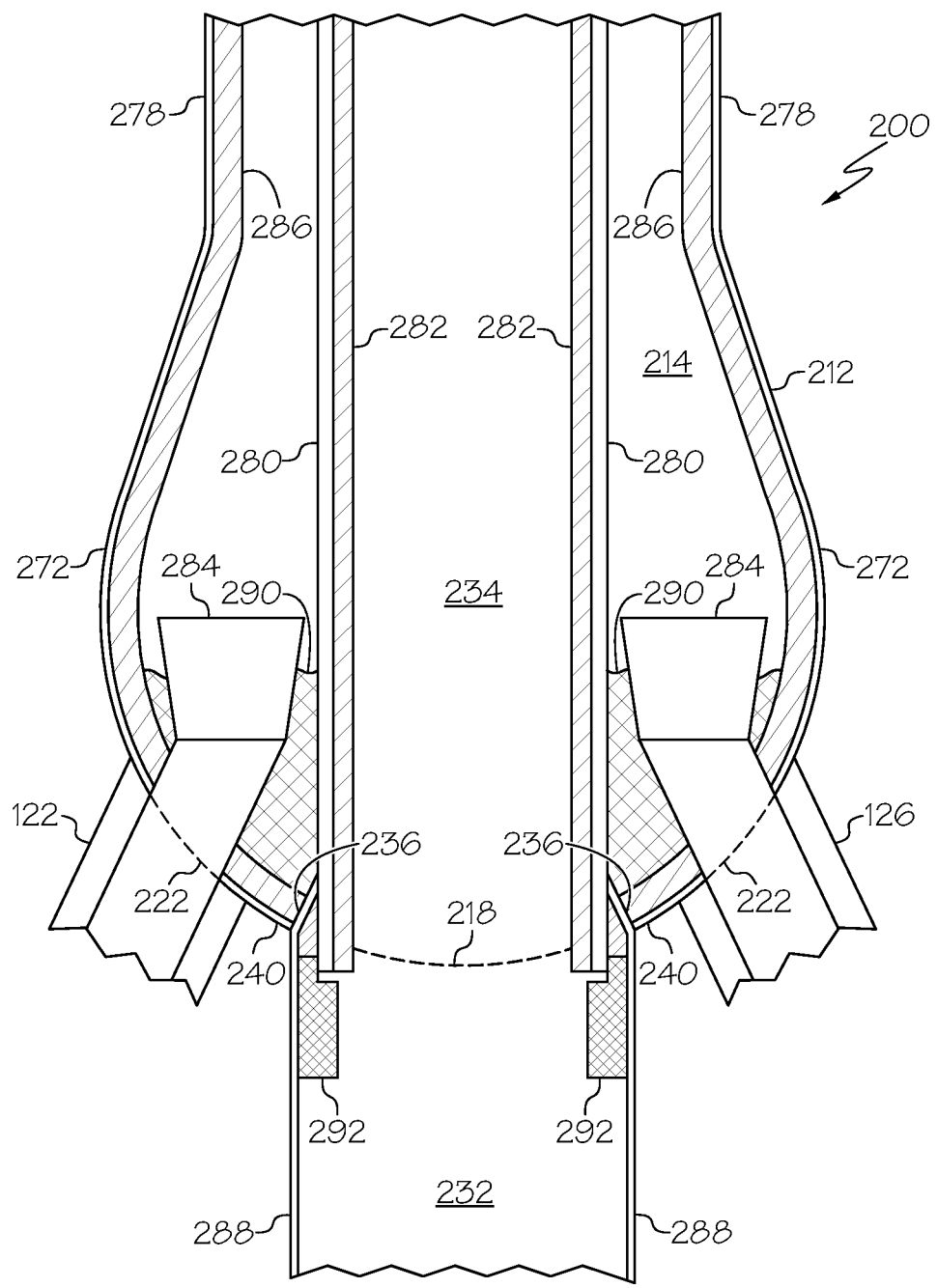
FIG. 2 schematically depicts a cross-sectional view of a portion of the reactor section of a fluid catalytic reactor system, according to one or more embodiments disclosed herein.

Now referring to FIG. 2, a detailed view of the area around the lower segment 272 of the catalyst separation section 210 is depicted. Among other features, FIG. 2 depicts the main interior riser wall segment 280, the main external riser wall segment 288, as well as various refractory materials and other wall segments of the system. Generally, the main interior riser wall segment 280 and the main exterior wall segment may be tubular and substantially parallel with one another (i.e., forming an angle of less than 15° with one another). The main interior riser wall segment 280 may be connected to the main external riser wall segment 288 via a riser transition wall segment 236.

In some embodiments, the lower segment 272 of the catalyst separation section 210 may have a greater maximum diameter than the middle segment 278 of the catalyst separation section 210. For example, the lower segment 272 of the catalyst separation section 210 may protrude outwardly from the middle segment 278 of the catalyst separation section 210 in a bulb-like shape. The bottom section of the lower segment 272 may sometimes be referred to as a "hemispherical" shape. This widening may accommodate a frustum 284 through which catalyst is passed and enters standpipe 126 through the catalyst outlet port 222. As such, the channel through which the catalyst may travel (i.e., the space between the internal riser section 234 and the separation section walls 212) is widened. For example, the distance between the separation section walls 212 at the middle segment 278 of the catalyst separation section 210 and the internal riser section 234 may be less than the distance between the separation section walls 212 at the lower segment 272 of the catalyst separation section 210 and the internal riser section 234. Without being bound by theory, it is believed that the widening of the channel (such as by providing a bulb shaped lower segment 272) may be beneficial because the velocity at which the bubbles in the stream are moving downward may be reduced, which may allow them to disengage from the flowing solids prior to introduction to the standpipe 126, allowing for smooth passage of the catalyst through the catalyst outlet port 222 and out of the reactor section 200. For example, the presently disclosed design may mitigate the risk of creating local areas of high catalyst velocities in the stripper 224, which can lead to operational problems as the bubbles accelerate downward and then do not disengage just prior to entry into the standpipe 126. Additionally, the design may reduce bubbles being entrained into the standpipe 122, which can negatively impact the pressure build.

According to another embodiment, a bulb-like shaped lower segment 272 of the catalyst separation section 210 may provide enhanced mechanical support because it may allow for a wider joint ligament 240. As used herein, a "joint ligament" refers to the distance between the riser port 218, usually positioned at or near the axial center of the catalyst separation section 210, and the one or more catalyst outlet ports 222 positioned nearer the sides of the catalyst separation section 210. In general, the greater the distance of the joint ligament 240, the more mechanically stable the lower segment 272 may be. Moreover, in various embodiments, it should be understood that any curved shape is contemplated as a suitable shape for the lower segment 272 of the catalyst separation section 210 because it may provide for a wider joint ligament 240.

Figure 3:
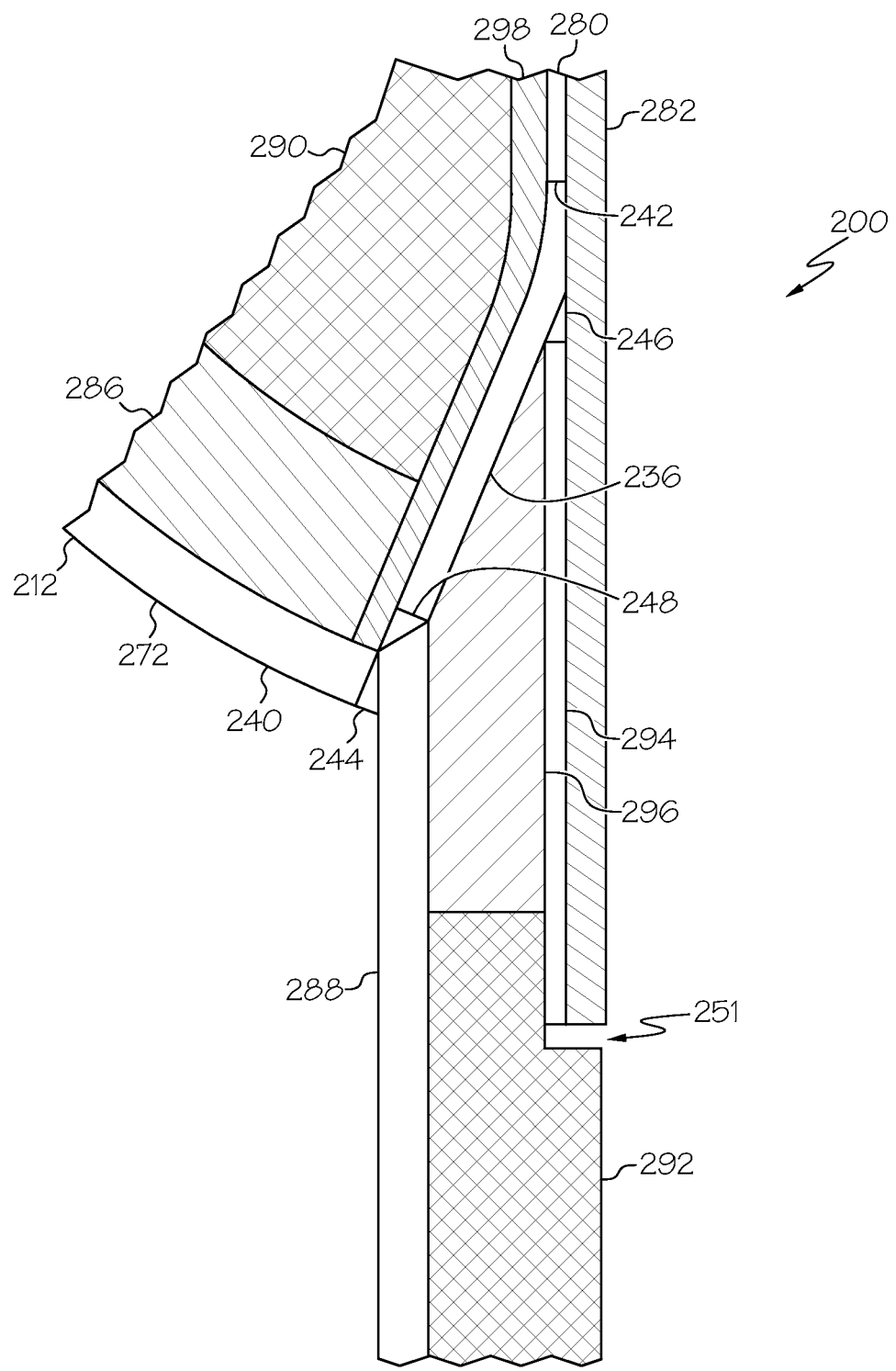
FIG. 3 schematically depicts a cross-sectional view of a portion of a reactor section of a fluid catalytic reactor system at the connection point of the internal riser section to the external riser section, according to one or more embodiments disclosed herein.

Now referring to FIGS. 2 and 3, according to one or more embodiments, the riser 230 may comprise a main interior riser wall segment 280, a riser transition wall segment 236, and a main external riser wall segment 288. Generally, the majority (e.g., at least 90%) of the main external riser wall segment 288 may be outside of the catalyst separation section 210 (i.e., part of the external riser section 232), and the majority (e.g., at least 90%) of the main interior riser wall segment 280 may be within the catalyst separation section 210 (i.e., part of the internal riser section 234). The main external riser wall segment 288 may have a relatively constant diameter (e.g., not varying by more than about 10%) and the main interior riser wall segment 280 may have a relatively constant diameter (e.g., not varying by more than about 10%).

The riser transition wall segment 236 may connect the main interior riser wall segment 280 with the main external riser wall segment 288, either directly or via the lower segment 272 of the catalyst separation section 210. As depicted in FIG. 3, the riser transition wall segment 236 may be attached to the main interior riser wall segment 280 at attachment point 242 and to the main external riser wall segment 288 at attachment point 248. The riser transition wall segment 236 may project inwardly from the main external riser wall segment 288 of the external riser section 232 to the main interior riser wall segment 280 of the internal riser section 234.

As described herein, portions of system units such as reaction vessel walls, separation section walls, or riser walls, may comprise a metallic material, such as carbon or stainless steel. In addition, the walls of various system units may have portions which are attached with other portions of the same system unit or to another system unit. Sometimes, the points of attachment or connection are referred to herein as "attachment points" and may incorporate any known bonding medium such as, without limitation, a weld, an adhesive, a solder, etc. It should be understood that components of the system may be "directly connected" at an attachment point, such as a weld.

Still referring to FIG. 3, the an internal riser lip segment 294 may be connected to the main interior riser wall segment 280, the riser transition wall segment 236, or both. The internal riser lip segment 294 may generally be disposed in a direction generally parallel to one or more of the main interior riser wall segment 280 and the main external riser wall segment 288. As shown in FIG. 3, in some embodiments, the main external riser wall segment 288 may coaxially surround at least a portion of the internal riser lip segment 294. For example, the main external riser wall segment 288 may coaxially surround the internal riser lip segment 294 along a length of the external riser section 232 that is at or near the riser transition wall segment 236.

According to some embodiments, the internal riser lip segment 294 may be about aligned with the main interior riser wall segment 280, and an angle of about 25 degrees (such as from about 20 degrees to about 30 degrees, or from about 15 degrees to about 35 degrees) may be formed between the riser transition wall segment 236 and the main interior riser wall segment 280 and/or the internal riser lip segment 294.

Still referring to FIGS. 2 and 3, refractory materials may be included in the riser 230 as well as the catalyst separation section 210. It should be understood that while embodiments are provided of specific refractory material arrangements and materials, they should not be considered limiting regarding the physical structure of the disclosed system. For example, refractory liner 282 may be attached to and act as an erosion protectant or thermal liner for the main interior riser wall segment 280 and internal riser lip segment 294 within the internal riser section 234. The refractory liner 282 may extend in the riser 230 into the middle segment 278 and upper segment 276 of the catalyst separation section 210. The refractory liner 282 may end at or near the bottom of the internal riser lip segment 294. The refractory liner 282 may include hex mesh or other suitable refractory materials. Refractory liner 298 may be attached to and act as a thermal liner for the riser transition wall segment 236 and the main interior riser wall segment 280. For example, the refractory liner 298 may run from the separation section walls 212 at the joint ligament 240 to the middle segment 278 of the catalyst separation section 210 on the outer surface of the internal riser section 234. In certain embodiments, the refractory liner 298 may be a ceramic fiber blanket or refractory material, or a combination of both.

In additional embodiments, separation section walls 212 in the lower segment 272 of the catalyst separation section 210 may include a refractory liner 286 which coats, at least partially, its interior surface. Refractory material 290 may be positioned adjacent the frustum 284. Additionally, refractory material 296 may be positioned between the main external riser wall segment 288 and the internal riser lip segment 294, in contact with the riser transition wall segment 236. Refractory material 292 may be positioned between the main external riser wall segment 288 and the main interior riser wall segment 280, and may hang over and extend past the internal riser lip segment 294. The refractory material 292 may define a gap 251 of void space between itself and the main interior riser wall segment 280 and refractory liner 282. In embodiments, the refractory material 292 may extend into the external riser section 230, coating the walls of the external riser section 230.

Figure 4A:
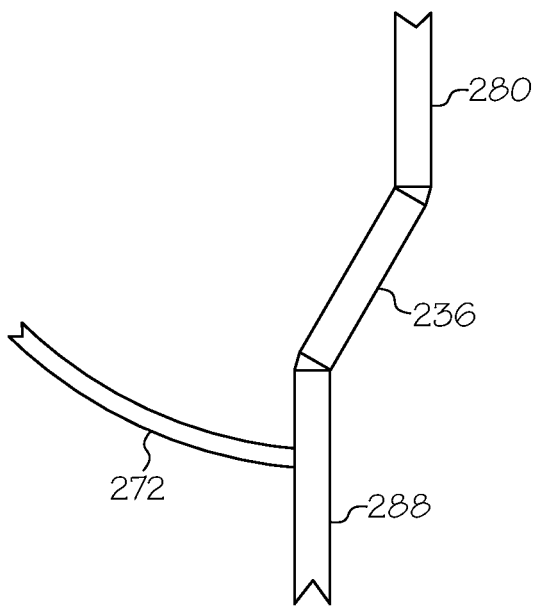
FIG. 4A schematically depicts a simplified cross-sectional view of an embodiment of a portion of a reactor section of a fluid catalytic reactor system at the connection point of the internal riser section to the external riser section, according to one or more embodiments disclosed herein.
Figure 4B:
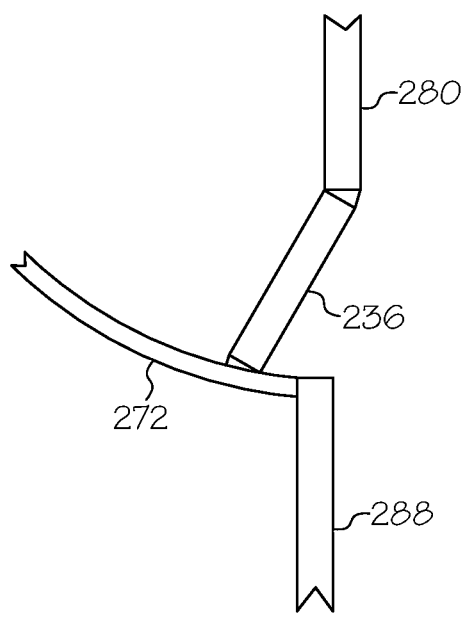
FIG. 4B schematically depicts a simplified cross-sectional view of another embodiment of a portion of a reactor section of a fluid catalytic reactor system at the connection point of the internal riser section to the external riser section, according to one or more embodiments disclosed herein.
Figure 4C:
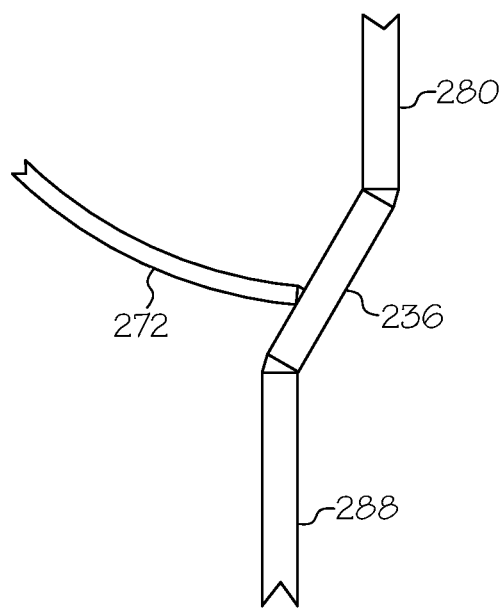
FIG. 4C schematically depicts a simplified cross-sectional view of another embodiment of a portion of a reactor section of a fluid catalytic reactor system at the connection point of the internal riser section to the external riser section, according to one or more embodiments disclosed herein.

As depicted in FIG. 3, the main interior riser wall segment 280 may be connected to the riser transition wall segment 236, and the riser transition wall segment 236 may be connected to the main external riser wall segment 288. In the embodiment of FIG. 3, the lower segment 272 of the catalyst separation section 210 is attached to the main external riser wall segment 288 at attachment point 244. However, other embodiments, such as those depicted in FIGS. 4A-4C may be suitable arrangements for connection between the main interior riser wall segment 280, the riser transition wall segment 236, and the main external riser wall segment 288. It should be understood that FIGS. 4A-4C are have been simplified to only illustrate the main interior riser wall segment 280, riser transition wall segment 236, main external riser wall segment 288, and lower segment 272 of the catalyst separation section 210. Thus, it should be understood that the embodiments of FIGS. 4A-4C may additionally include various refractory materials and other components such as a internal riser lip segment 294, which are not depicted in FIGS. 4A-4C.

Referring to FIGS. 4A-4C, according to various embodiments, the lower segment 272 of the catalyst separation section 210 may be attached to the riser transition wall segment 236, the main external riser wall segment 288, or both. For example, referring to FIG. 4A, the lower segment 272 of the catalyst separation section 210 may be directly connected with the main external riser wall segment 288, and the main external riser wall segment 288 may be directly connected to the riser transition wall segment 236, which is also directly connected to the main interior riser wall segment 280. The distance between the area of direct connection of the lower segment 272 with the main external riser wall segment 288 and the riser transition wall segment 236 with the main external riser wall segment 288 may be about 1 to 5 inches, such as 1 to 2 inches. In such an embodiment, a portion of the main external riser wall segment 288 is within the catalyst separation section 210 and a portion of the main external riser wall segment 288 is positioned within the catalyst separation section 210. However, the majority of the main external riser wall segment 288 is outside of the catalyst separation section 210.

According to the embodiment depicted in FIG. 4B, the lower segment 272 may be directly connected to the riser transition wall segment 236 and the main external riser wall segment 288. In such an embodiment, the riser transition wall segment 236 may be indirectly connected with the main external riser wall segment 288 via the lower segment 272. In such an embodiment, the entirety of the riser transition wall segment 236 is within the catalyst separation section 210.

According to the embodiment depicted in FIG. 4C, the main interior riser wall segment 280 is directly connected with the riser transition wall segment 236, which is directly connected with the main external riser wall segment 288. The lower segment 272 is directly connected with the riser transition wall segment 236, between the point of connection between the riser transition wall segment 236 and the main external riser wall segment 288, and the point of connection between the riser transition wall segment 236 and the main interior riser wall segment 280. In such an embodiment, a portion of the riser transition wall segment 236 is within the catalyst separation section 210, and a portion of the riser transition wall segment 236 is outside of the catalyst separation section 210.

According to embodiments, the riser transition wall segment 236 may have a length that is less than or equal to about 50% of the maximum diameter of the internal riser section 234 (such as less than or equal to about 40%, less than or equal to about 30%, less than or equal to about 20%, less than or equal to about 15%, less than or equal to about 10%, less than or equal to about 5%). The relatively small length of the riser transition wall segment 236 may accommodate a main interior riser wall segment 280 and a main external riser wall segment 288 which have maximum diameters that are within 25%, 20%, 15%, 10%, or even 5% of one another. For example, the maximum diameter of the main internal riser wall segment 280 may be at least 75%, 80%, 85%, 90%, or even 95% of the maximum diameter of the main external riser wall segment 288.

Mechanical loads applied onto the reactor vessel 250 from the weight of the catalyst and other parts of the reactor section 200 may be high, and springs may be utilized to apply pressure upwardly on the reactor vessel 250. For example, the reactor vessel 250 may be hung from springs, or springs may be positioned below the reactor vessel 250 to support its weight. For example, FIG. 1 spring supports 188 mechanically attached to the reactor section 200 at the reactor vessel 250, wherein the reactor section 200 is suspended from a support structure by the spring supports 188.

After separation in the catalyst separation section 210, the spent catalyst is transferred to the regeneration section 300. The regeneration section 300, as described herein, may share many structural similarities with the reactor section 200. As such, the reference numbers assigned to the portions of the regeneration section 300 are analogous to those used with reference to the reactor section 200, where if the final two digits of the reference number are the same the given portions of the reactor section 200 and regeneration section 300 may serve similar functions and have similar physical structure. Thus, many of the present disclosures related to the reactor section 200 may be equally applied to the regeneration section 300, and distinctions between the reactor section 200 and the regeneration section 300 will be highlighted hereinbelow.

Referring now to the regeneration section 300, as depicted in FIG. 1, the reactor vessel 350 (such as a combustor) of the regeneration section 300 may include one or more reactor vessel inlet ports 352 and a reactor vessel outlet port 354 in fluid communication with (such as directly connected to) the external riser section 332 of the riser 330. The reactor vessel 350 may be in fluid communication with the catalyst separation section 210 via standpipe 126, which may supply spent catalyst from the reactor section 200 to the regeneration section 300 for regeneration. The reactor vessel 350 may include an additional reactor vessel inlet port 352 where air inlet 128 connects to the reactor vessel 350. The air inlet 128 may supply reactive gases which may react with the spent catalyst to at least partially regenerate the catalyst. For example, the catalyst may be coked following the reactions in the reactor vessel 250, and the coke may be removed from the catalyst (i.e., regenerating the catalyst) by a combustion reaction. For example, oxygen (such as air) may be fed into the reactor vessel 350 via the air inlet 128.

As depicted in FIG. 1, the reactor vessel 350 may be directly connected to the external riser section 332 of the riser 330. In one embodiment, the reactor vessel 350 may include a reactor vessel body section 356 and a reactor vessel transition section 358. The reactor vessel body section 356 may generally comprise a greater diameter than the reactor vessel transition section 358, and the reactor vessel transition section 358 may be tapered from the size of the diameter of the reactor vessel body section 356 to the size of the diameter of the external riser section 332 such that the reactor vessel transition section 358 projects inwardly from the reactor vessel body section 356 to the external riser section 332.

Still referring to FIG. 1, the catalyst separation section 310 includes separation section walls 312 defining an interior region 314 of the catalyst separation section 310. The riser 330 extends into the interior region 314 of the regeneration section 300 via a riser port 318. The riser port 318 may be any opening in the catalyst separation section 310 through which at least the internal riser section 334 of the riser 330 protrudes into the interior region 314 of the catalyst separation section 310.

Similar to the reactor section 200, conventional examples of the regeneration section 300 may incorporate a unitary reactor/separator design where the reactor and separator are separated by a wall. Utilizing an external riser between the catalyst separation section and the reactor vessel may allow for better thermal control of the catalyst separation section 310 since it is not directly connected to the heat-generating reactor vessel 350.

In one or more embodiments, the catalyst separation section 310 may include several segments. For example, as depicted in FIG. 1, the catalyst separation section 310 may include an upper segment 376 and a lower segment 372. The internal riser section 334 may extend through the riser port 318 of the catalyst separation section 310 and through the lower segment 372 and into the upper segment 376. At the upper segment 376, the internal riser section 334 may be in fluid communication with the riser termination separator. The fluid stream may then pass to the secondary separation device 320, which may be any mechanical separation devices which may be operable to separate solid particles from gas phases, such as a cyclone or plurality of cyclones, such as multiple cyclones in series. The secondary separation device 320 may be operable to deposit separated catalyst into the bottom of the upper segment 376 or into the lower segment 372. The lower segment 372 may include the catalyst outlet port 322.

Figure 5:
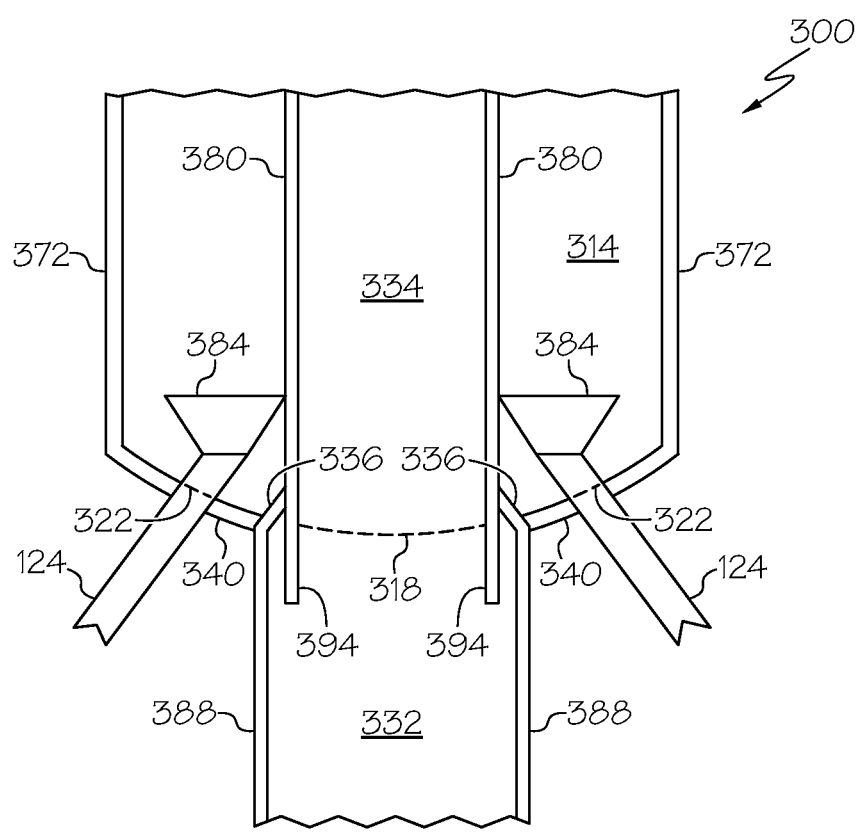
FIG. 5 schematically depicts a cross-sectional view of the portion of a regeneration section fluid catalytic reactor system, according to one or more embodiments disclosed herein.

Now referring to FIGS. 1 and 5, in one embodiment, the lower segment 372 of the catalyst separation section 310 may include an ellipsoidal shape at or near the riser port 318. For example, as depicted in FIGS. 1 and 5, the lower segment 372 may include a cylinder geometry with a ellipsoidal bottom to the cylinder. The ellipsoidal shape may contribute to an increased length of the joint ligament 340. Other curved shapes may also be suitable, such as the bulb shaped disclosed in reference to the reactor section 200. Likewise, the ellipsoidal shaped lower segment 372 may be suitable for the reactor section 200.

It should be understood that the regeneration section 300 may include a riser transition sidewall 336, similar to the riser transition wall segment 236 described with regards to the reactor section. For example, the embodiments depicted in FIGS. 3A-3C may be applicable to the riser 330 of the regeneration section. Additionally, spring supports 188 may be utilized to support mechanical loads applied on the reactor vessel 350.

The systems described herein may be utilized as processing equipment for various fluidized catalyst reactions. For example, hydrocarbons, as well as other chemical feedstocks, can be converted into desirable products through use of fluidized bed reactors. Fluidized bed reactors serve many purposes in industry, including dehydrogenation of paraffins and/or alkyl aromatics, cracking of hydrocarbons (i.e., fluid catalytic cracking), chlorination of olefins, oxidations of naphthalene to phthalic anhydride, production of acrylonitrile from propylene, ammonia, and oxygen, Fischer-Tropsch synthesis, and polymerization of ethylene.

For the purposes of describing and defining the present invention it is noted that the terms "about" or "approximately" are utilized herein to represent the inherent degree of uncertainty that may be attributed to any quantitative comparison, value, measurement, or other representation. The term is also utilized herein to represent the degree by which a quantitative representation may vary from a stated reference without resulting in a change in the basic function of the subject matter at issue.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

It is also noted that recitations herein refer to a component of the present invention being "configured" in a particular way. In this respect, such a component is "configured" to embody a particular property, or function in a particular manner, where such recitations are structural recitations as opposed to recitations of intended use. More specifically, the references herein to the manner in which a component is "configured" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

The invention claimed is:

1. A system component of a fluid catalytic reactor system, the system component comprising:
   a catalyst separation section comprising separation section walls defining an interior region of the catalyst separation section, a gas outlet port, a riser port, a separation device, and a catalyst outlet port;

a riser extending through the riser port of the catalyst separation section, the riser comprising a main interior riser wall segment, a main exterior riser wall segment, and a riser transition wall segment, the main interior riser wall segment positioned at least partially in the interior region of the catalyst separation section and connected with at least the riser transition wall segment, and the exterior riser wall segment positioned at least partially outside of the catalyst separation section; and a reactor vessel comprising a reactor vessel body section, a reactor vessel inlet port, and a reactor vessel outlet port connected to the main exterior riser wall segment, wherein:

the maximum diameter of the main interior riser wall segment is less than the maximum diameter of the main exterior riser wall segment; and the maximum diameter of the reactor vessel body section is greater than the maximum diameter of the main exterior riser wall segment.

2. The system component of claim 1, wherein the main interior riser wall segment and the main exterior riser wall segment are substantially parallel.

3. The system component of claim 1, wherein the majority of the main exterior riser wall segment is outside of the catalyst separation section and the majority of the main interior riser wall segment is in the interior region of the catalyst separation section.

4. The system component of claim 1, wherein the riser transition wall segment projects outwardly from the main internal riser wall segment and connects to one or more of the main external riser wall segment or the catalyst separation section.

5. The system component of claim 1, wherein the riser transition wall segment is positioned in the interior region of the catalyst separation section.

6. The system component of claim 1, wherein the riser transition wall segment has a length that is less than or equal to about 50% of a maximum diameter of the main interior riser wall segment.

7. The system component of claim 1, wherein the reactor vessel comprises a reactor vessel transition section, the reactor vessel transition section in contact with the main external riser wall segment and the reactor vessel body section such that the reactor vessel transition section projects inwardly from the reactor vessel body section to the main external riser wall segment.

8. The system component of claim 1, wherein the system component is a reactor section of the fluid catalytic reactor system or is a regeneration section of the fluid catalytic reactor system.

9. A fluid catalytic reactor system comprising a reactor section and a regeneration section, the reactor section comprising:

a catalyst separation section comprising separation section walls defining an interior region of the catalyst separation section, a gas outlet port, a riser port, a separation device, and a catalyst outlet port;

a riser extending through the riser port of the catalyst separation section, the riser comprising a main interior riser wall segment, a main exterior riser wall segment, and a riser transition wall segment, the main interior riser wall segment positioned at least partially in the interior region of the catalyst separation section and connected with at least the riser transition wall segment, and the exterior riser wall segment positioned at least partially outside of the catalyst separation section; and a reactor vessel comprising a reactor vessel body section, a reactor vessel inlet port, and a reactor vessel outlet port connected to the main exterior riser wall segment, wherein:

the maximum diameter of the reactor vessel body section is greater than the maximum diameter of the main exterior riser wall segment.

10. The system component of claim 8, wherein the main interior riser wall segment and the main exterior riser wall segment are substantially parallel, and the maximum diameter of the main interior riser wall segment is less than the maximum diameter of the main exterior riser wall segment.

11. The system component of claim 8, wherein the majority of the main exterior riser wall segment is outside of the catalyst separation section and the majority of the main interior riser wall segment is in the interior region of the catalyst separation section.

12. The fluid catalytic reactor system of claim 8, wherein the reactor vessel comprises a reactor vessel transition section, the reactor vessel transition section in contact with the external riser section and the reactor vessel body section such that the reactor vessel transition section projects inwardly from the reactor vessel body section to the external riser section.

13. A fluid catalytic reactor system comprising a reactor section and a regeneration section, the regeneration section comprising:

a catalyst separation section comprising separation section walls defining an interior region of the catalyst separation section, a gas outlet port, a riser port, a separation device, and a catalyst outlet port;

a riser extending through the riser port of the catalyst separation section, the riser comprising a main interior riser wall segment, a main exterior riser wall segment, and a riser transition wall segment, the main interior riser wall segment positioned at least partially in the interior region of the catalyst separation section and connected with at least the riser transition wall segment, and the exterior riser wall segment positioned at least partially outside of the catalyst separation section; and a reactor vessel comprising a reactor vessel body section, a reactor vessel inlet port, and a reactor vessel outlet port in fluid communication with the main exterior riser wall segment, wherein:

the maximum diameter of the main interior riser wall segment is less than the maximum diameter of the main exterior riser wall segment; and the maximum diameter of the reactor vessel body section is greater than the maximum diameter of the main exterior riser wall segment.

14. The fluid catalytic reactor system of claim 13, wherein the catalyst separation section comprises a lower segment comprising the catalyst outlet port and the riser port, the lower segment comprising an ellipsoidal shape.

15. The system component of claim 13, wherein the main interior riser wall segment and the main exterior riser wall segment are substantially parallel.

* * * * *